United States Patent
Fry et al.

(10) Patent No.: US 8,103,900 B2
(45) Date of Patent: Jan. 24, 2012

(54) IMPLEMENTING ENHANCED MEMORY RELIABILITY USING MEMORY SCRUB OPERATIONS

(75) Inventors: Richard E. Fry, Round Rock, TX (US); Marc A. Gollub, Round Rock, TX (US); Eric E. Retter, Austin, TX (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 12/510,311

(22) Filed: Jul. 28, 2009

(65) Prior Publication Data
US 2011/0029807 A1 Feb. 3, 2011

(51) Int. Cl.
*G06F 11/00* (2006.01)
(52) U.S. Cl. ............. 714/6.1; 714/5.1; 714/42; 714/43; 714/56
(58) Field of Classification Search ............ 714/5, 8, 714/25, 30, 42, 46, 44, 54, 563, 43, 56, 6.23, 714/6.13, 4.5, 5.1, 6.1
See application file for complete search history.

(56) References Cited

U.S. PATENT DOCUMENTS

| | | | |
|---|---|---|---|
| 6,279,128 B1 * | 8/2001 | Arnold et al. ............... | 714/49 |
| 7,246,269 B1 * | 7/2007 | Hamilton .................... | 714/42 |
| 2001/0047497 A1 * | 11/2001 | Larson et al. ............... | 714/42 |
| 2004/0030957 A1 * | 2/2004 | Yadavalli et al. ............ | 714/30 |
| 2005/0273646 A1 * | 12/2005 | Hillier et al. ................ | 714/5 |
| 2006/0106975 A1 * | 5/2006 | Bellows et al. .............. | 711/105 |
| 2008/0002513 A1 * | 1/2008 | Thompson ................. | 365/233 |
| 2008/0148108 A1 * | 6/2008 | Barnum et al. ............. | 714/54 |
| 2009/0070648 A1 * | 3/2009 | Allison et al. .............. | 714/746 |
| 2009/0070654 A1 * | 3/2009 | Flachs et al. ............... | 714/758 |
| 2009/0177932 A1 * | 7/2009 | Abts et al. .................. | 714/704 |

* cited by examiner

*Primary Examiner* — Robert Beausoliel, Jr.
*Assistant Examiner* — Joseph D Manoskey
(74) *Attorney, Agent, or Firm* — Joan Pennington

(57) ABSTRACT

A method and circuit for implementing enhanced memory reliability using memory scrub operations to determine a frequency of intermittent correctable errors, and a design structure on which the subject circuit resides are provided. A memory scrub for intermittent performs at least two reads before moving to a next memory scrub address. A number of intermittent errors is tracked where an intermittent error is identified, responsive to identifying one failing read and one passing read of the at least two reads.

20 Claims, 8 Drawing Sheets

FIG.4A

FRAME FORMAT 400

| SPARE | CRC 402 | DATA 404 | COMMAND 406 |
|---|---|---|---|

FIG.4B

ADDR/CMD WORD FORMAT 410

| CRC 412 | DATA 414 | ADDRESS 416 | CHIP ID 418 | COMMAND 420 |
|---|---|---|---|---|

IMPLEMENTING ENHANCED MEMORY RELIABILITY USING MEMORY SCRUB OPERATIONS

FIELD OF THE INVENTION

The present invention relates generally to the data processing field, and more particularly, relates to a method and circuit for implementing enhanced memory system reliability using memory scrub operations to determine a frequency of intermittent correctable errors in a memory structure including a interconnect bus and memory devices, and a design structure on which the subject circuit resides.

DESCRIPTION OF THE RELATED ART

Modern computer systems typically are configured with a large amount of memory in order to provide data and instructions to one or more processors in the computer systems.

Historically, processor speeds have increased more rapidly than memory access times to large portions of memory, in particular, DRAM memory (Dynamic Random Access Memory). Memory hierarchies have been constructed to reduce the performance mismatches between processors and memory. For example, most modern processors are constructed having an L1 (level 1) cache, constructed of SRAM (Static Random Access Memory) on a processor semiconductor chip. L1 cache is very fast, providing reads and writes in only one, or several cycles of the processor. However, L1 caches, while very fast, are also quite small, perhaps 64 KB (Kilobytes) to 256 KB. An L2 (Level 2) cache is often also implemented on the processor chip. L2 cache is typically also constructed using SRAM storage, although some processors utilize DRAM storage. The L2 cache is typically several times larger in number of bytes than the L1 cache, but is slower to read or write. Some modern processor chips also contain an L3 (Level 3) cache. L3 cache is capable of holding several times more data than the L2 cache. L3 cache is sometimes constructed with DRAM storage. L3 cache in some computer systems is implemented on a separate chip or chips from the processor, and is coupled to the processor with wiring on a printed wiring board (PWB) or a multi-chip module (MCM). Main memory of the computer system is typically large, often many GB (gigabytes) and is typically implemented in DRAM.

Main memory is typically coupled to a processor with a memory controller, which may be integrated on the same device as the processor or located separate from the processor, often on the same MCM (multi-chip module) or PWB. The memory controller receives load or read commands and store or write commands from the processor and services those commands, reading data from main memory or writing data to main memory. Typically, the memory controller has one or more queues, for example, read queues and write queues. The read queues and write queues buffer information including one or more of commands, controls, addresses and data; thereby enabling the processor to have multiple requests—including read and/or write requests, in process at a given time.

Extensive research and development efforts are invested by the industry, on an ongoing basis, to create improved, innovative solutions for maximizing overall system performance and density by improving the memory system or memory subsystem design and structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, and the like. Other frequent customer requirements further exacerbate the memory system design challenges, and include such items as ease of upgrade and reduced system environmental impact, such as space, power and cooling.

As speeds of DRAM interfaces increase there becomes an increased probability of a read including a correctable error resulting from one or more of the memory devices, any interconnect structure in the memory signal path, the memory interface, coupled noise, power supply fluctuations or noise, temperature variations, timing drift, and the like. A need exists for an effective, low cost mechanism to insure correct operation of the DRAM interface and to isolate possible intermittent interface, clocking, power issues, and the like from hard memory failures to achieve enhanced memory reliability.

SUMMARY OF THE INVENTION

Principal aspects of the present invention are to provide a method and circuitry for implementing enhanced memory system reliability using enhanced memory scrub operations to determine a frequency of intermittent correctable errors, and a design structure on which the subject circuitry resides. Other important aspects of the present invention are to provide such method, circuitry, and design structure substantially without negative effect and that overcome many of the disadvantages of prior art arrangements.

In brief, a method and circuit for implementing enhanced memory system reliability using memory scrub operations to determine a frequency of intermittent correctable errors, and a design structure on which the subject circuit resides are provided. A memory scrub for intermittent fails performs at least two reads before moving to a next memory scrub address. A number of intermittent errors is tracked, where an intermittent error is identified, responsive to identifying one failing read and one passing read of the at least two reads.

In accordance with features of the invention, a bus calibration is implemented responsive to a predefined intermittent error count. When the bus calibration fails or a predetermined number of intermittent errors occur over a predetermined period of time, a bus fault error recovery mode is initiated.

In accordance with features of the invention, when the first read and the second read fail, a modify write is performed at the failing memory address before moving to a next memory scrub address.

In accordance with features of the invention, a normal or conventional scrub is performed for a first time period, and the scrub for intermittent fails is performed for a second time period.

In accordance with features of the invention, a scrub for intermittent fails optionally replaces the normal or conventional memory scrub operation and the scrub for intermittent fails is performed for a first time period, and the scrub for conventional memory fails is performed for a second time period, either of the first and second time periods can be between 0 and 100% of the total scrub operations over a third time period comprising at least the first and second time periods.

In accordance with features of the invention, a bus calibration includes a predefined or programmable diagnostic sequence and a predefined or programmable retraining sequence. The bus calibration optimally provides a signal pattern and timing sequence for centering a data eye to a predefined timing reference, clock or data strobe signal. When the calibration fails, a bus fault error recovery sequence is performed.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4A and 4B are block diagrams respectively illustrating an example frame format and an example word format for implementing enhanced memory reliability using memory scrub operations to determine a frequency of intermittent correctable errors in accordance with the preferred embodiment;

DETAILED DESCRIPTION OF THE PREFERRED EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In accordance with features of the invention, methods are provided using novel memory scrub operations to determine a frequency of intermittent correctable errors. For example, the novel memory scrub operation of the invention performs at least two reads before moving to a next memory scrub address. The method of the invention tracks a number of intermittent errors, where an intermittent error is identified, responsive to identifying one failing read and one passing read of the at least two reads. The novel memory scrub operation of the invention is called a scrub for intermittent fails.

In accordance with features of the invention, a normal or conventional scrub is performed for a first time period, and the scrub for intermittent fails is performed for a second time period. For example, a normal scrub is run for 12 hours after which the scrub changes to the scrub for intermittent fails for the next 12 hour time period. In an alternate exemplary embodiment, the scrub for intermittent fails is run for a period ranging from 0% of the total scrub period to 100% of the total scrub period, over a third time period, in response to preprogrammed system operation, the identification of one or more read faults during the scrub operation currently being run, exceeding or falling below a fail limit over a specified time period, and the like.

Figure 1:
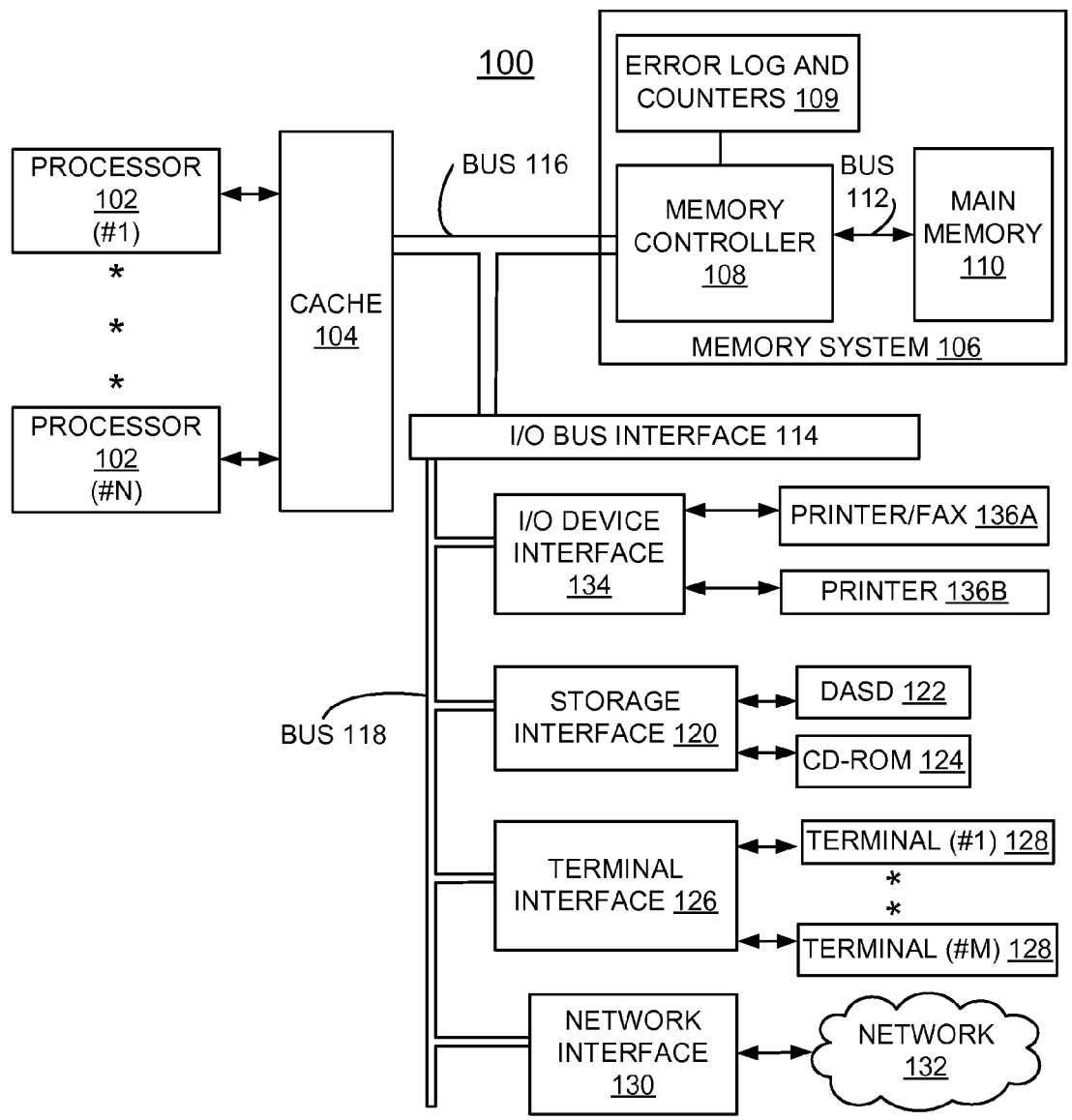
FIG. 1 is a block diagram of a computer system embodying the present invention.

Having reference now to the drawings, in FIG. 1, there is shown a computer system embodying the present invention generally designated by the reference character 100 for implementing enhanced memory reliability using memory scrub operations to determine a frequency of intermittent correctable errors in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 including an error log and one or more counters 109 in accordance with an embodiment of the invention and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRX) SDRAM, non-volatile memory, optical storage, and other storage devices.

I/O bus interface 114, and buses 116,118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. It should be understood that the present invention is not limited to the illustrated arrangement of computer system 100. Although main memory 102 and cache 106 are represented conceptually in FIG. 1 as single entities, it will be understood that in fact these are more complex, and that cache may exist at multiple different levels, as is known in the art. In particular, main memory subsystem 102 comprises multiple modules and communications components.

Figure 2:
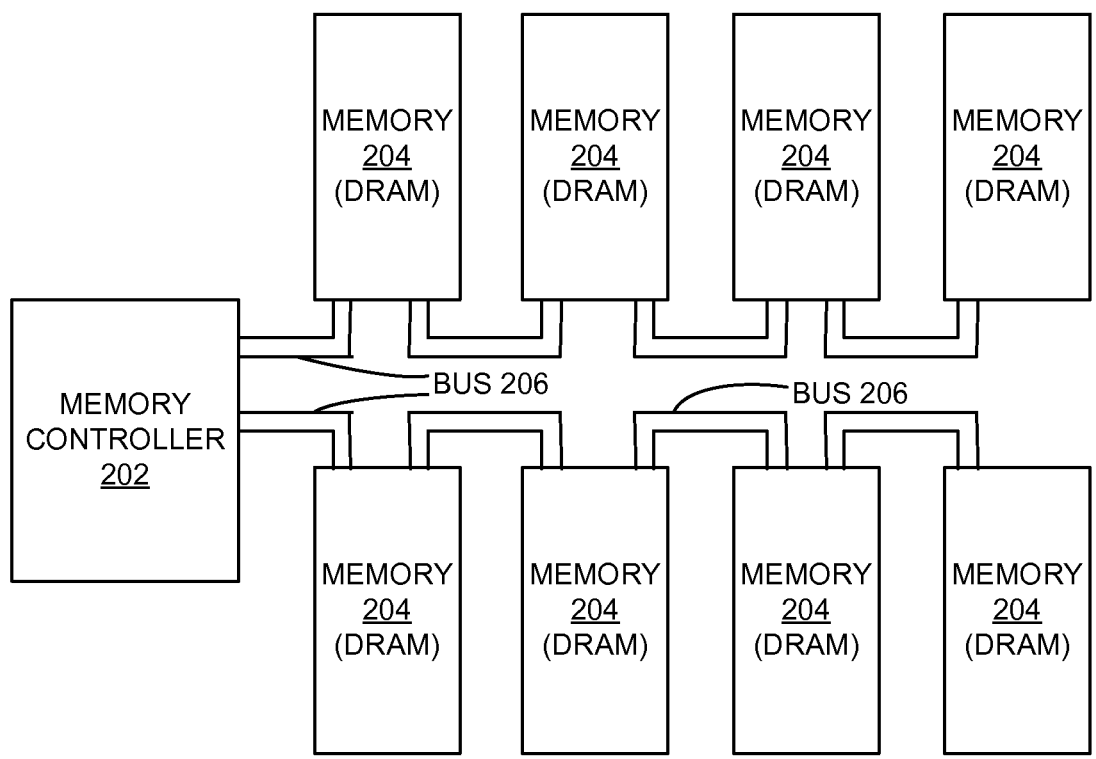
FIGS. 2, and 3 are block diagrams each respectively illustrating an example memory system for implementing enhanced memory reliability using memory scrub operations to determine a frequency of intermittent correctable errors in accordance with the preferred embodiment.
Figure 3:
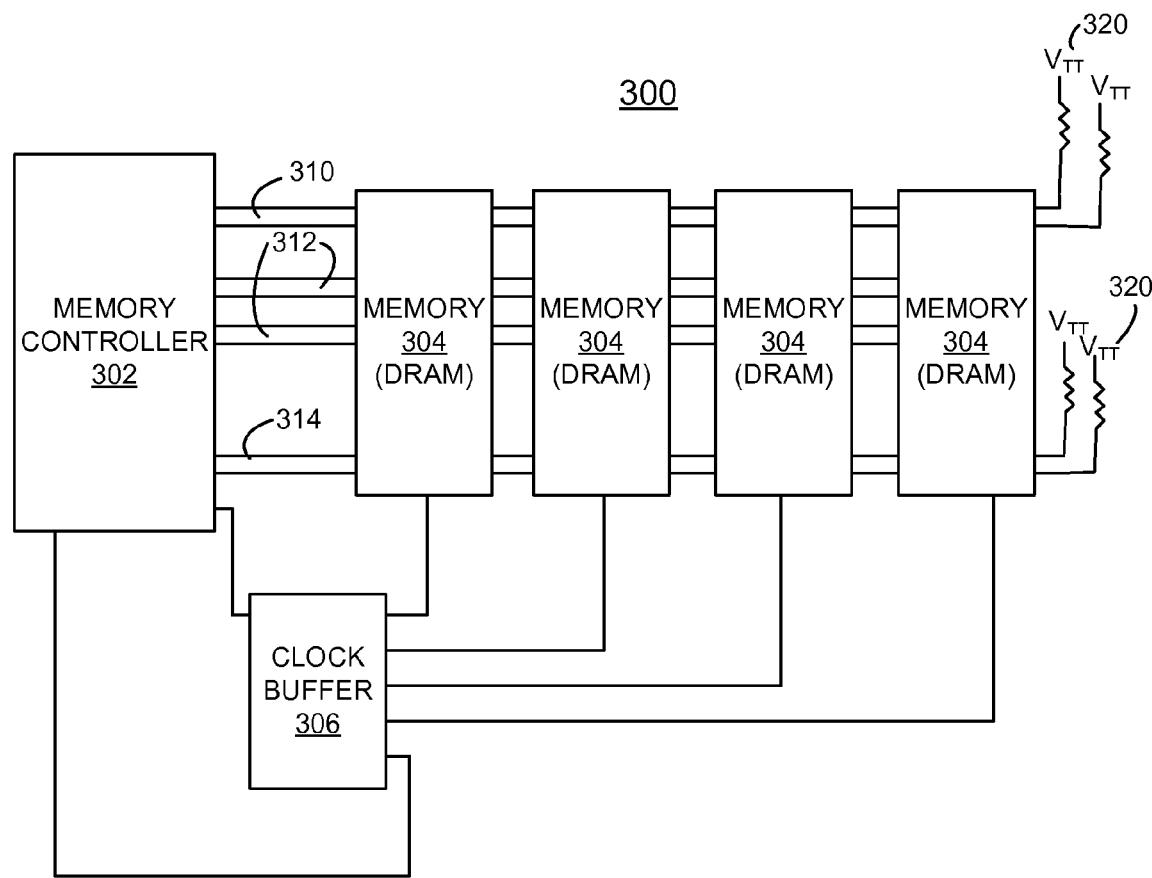

Example embodiments for implementing memory system 106 in accordance with the preferred embodiment including the example configurations of controller 108 including the error log and counters 109, main memory 110 and bus 112 are illustrated in FIGS. 2 and 3.

In accordance with features of the invention, one or more memory controllers of the preferred embodiment, such as memory controller 108 of the memory system 106, implements enhanced memory reliability using exemplary memory scrub operations to determine a frequency of intermittent correctable errors in accordance with the preferred embodiments. It should be understood that various configurations of controller 108 including the error log and counters 109, main memory 110 and bus 112 can be used to implement the present invention. The present invention can be applied to any memory structure including for example, a multi-drop bus with multiple memory subsystems attached to the bus without redrive circuitry between devices, a cascade interconnect with each memory subsystem capturing and redriving the bus, and other interconnect structures.

FIG. 2 illustrates an example memory system generally designated by the reference character 200 for implementing enhanced memory reliability using memory scrub operations to determine a frequency of intermittent correctable errors in accordance with the preferred embodiment. Memory system 200 includes a memory controller 202, which is an embodiment of memory controller 108 of FIG. 1, and a plurality of memory chips or modules 204. Memory system 200 is a cascaded memory structure that may be utilized by exemplary embodiments of the present invention when buffered memory modules 204, for example, with the buffer devices included within the memory modules 204 are in communication with a memory controller 202. This memory structure includes the memory controller 202 in communication with one or more memory modules 204 via one or more high speed point-to-point busses 206. Each bus 206 in the exemplary embodiment 200 includes, for example, approximately fifty high speed wires for the transfer of address, command, data and clocks in a packetized format. By using point-to-point busses it is possible to optimize the bus design to permit significantly increased data rates, as well as to reduce the bus pin count by transferring data over multiple cycles, such as a four to one bus speed ratio to maximize bus efficiency and minimize pin count.

Using the point-to-point bus 206 necessitates a bus redrive function on each memory module 204 to permit memory modules to be cascaded such that each memory module is interconnected to other memory modules, as well as to the memory controller 202. An exemplary embodiment of the present invention includes two unidirectional busses between the memory controller 202 and memory module 204, as well as between each successive memory module 204 in the cascaded memory structure 200. The downstream memory bus 206, for example, is comprised of twenty-two single-ended signals and a differential clock pair. The downstream memory bus 206 is used to transfer information such as address, control, command, data and error detection, such as CRC or EDC bits downstream from the memory controller 202, over one or more clock cycles, to one or more of the memory modules 204 installed on the cascaded memory channel. The upstream memory bus, for example, is comprised of twenty-three single-ended signals and a differential clock pair, and is used to transfer such information as memory data, status, error detection or error detection and correction bits upstream from the sourcing memory module 204 to the memory controller 202.

Other communication methods and signal counts may be utilized in alternate exemplary embodiments. For example, downstream and upstream signals may be differential signals, multi-level signals, optical signals and the like. Signal counts comprising the upstream and downstream busses may be smaller or larger than those in the exemplary embodiment based on the amount of information to be transferred, the desired communication bandwidth, the transfer rate utilized, and the like. Although unidirectional busses are included in the preferred embodiment 200, other buses such as bidirectional buses and other bus types may be utilized. Various clocking arrangments may be used to facilitate the capture of information transferred over busses 206 including single-ended clocking, differential clocking, source-synchronous clocking, independent clocks sourced to each receiving module, encoded clocks or other clocking or strobing arrangements.

FIG. 3 illustrates an example memory system generally designated by the reference character 300 for implementing enhanced memory reliability using memory scrub operations to determine a frequency of intermittent correctable errors in accordance with the preferred embodiment. Memory system 300 includes a memory controller 302, which is an embodiment of memory controller 108 of FIG. 1, and a plurality of memory modules 304, such as four registered dual in-line memory modules (DIMMs) 304 on a traditional multi-drop stub bus. Memory system 300 includes an external clock buffer 306 coupled to the memory controller 302 and the one or more memory devices, memory cards, memory modules or other storage devices 304, including one or more of an address bus 310, command and/or control busses 312 and a data bus 314. In an exemplary embodiment, terminators, such as fixed and/or programmable terminators 320 are utilized on the address bus 310 and the data bus 314. Terminators may be included at one or more ends or intermediate points of the one or more bus(es) 310, 312, 314 and clocks sourced from clock buffer 306—with alternate exemplary embodiments using other termination or no termination. Although Vtt termination is shown, other termination voltages may be utilized based on the signaling utilized. A single memory channel is shown in FIG. 2 and FIG. 3; however, systems produced with these modules often include more than one discrete memory channel from the memory controller, with each of the memory channels operated singly, or in parallel, for example, when two or more channels are populated with modules, wherein the operability may be selected based on such system characteristics as the memory data mapping, memory bandwidth, memory reliability, such as mirroring, to achieve the desired system functionality, reliability and/or performance. The memory channel configurations and utilization may be selectable by a program, processor or other mechanism to optimize memory operability for a given system application.

Referring to FIGS. 4A and 4B, example data transfer formats are illustrated that include error detection and correction code in conjunction with the data being transferred during a memory read for implementing enhanced memory reliability using memory scrub operations in accordance with the preferred embodiments.

Referring now to FIG. 4A, there is shown an example frame format generally designated by the reference character 400 for implementing enhanced memory reliability using memory scrub operations to determine a frequency of intermittent correctable errors in accordance with the preferred embodiment. Frame format 400 includes a plurality of fields including CRC 402, data 404 and command 406. Cyclic redundancy code bus error detection mechanisms may or may not be included in various embodiments of the current invention in addition to one or more spare bitlanes which may be used to replace one or more failing segments and/or entire bitlanes comprising the busses. The frame format may be comprised of one or more transfers, for example, 8 transfers such that the required command, data and CRC information can be transferred with a given number of bitlanes.

Referring now to 4B, there is shown an alternate exemplary transfer format generally designated by the reference character 410 for implementing enhanced memory reliability using memory scrub operations to determine a frequency of intermittent correctable errors in accordance with the preferred embodiment. Word format 410 includes a plurality of fields including CRC 412, data 414, address 416, chip ID 418 and command 420. Although not shown, one or more spare bitlanes could be included in alternate exemplary embodiments.

In accordance with features of the invention, methods are provided using multiple reads, for example, two or more reads during memory scrub operations to identify intermittent correctable errors. Conventional memory scrub operations consist of a single read operation with the receiving device, such as the memory controller, including error detection and correction circuitry such that any failing memory read can have the data corrected by a subsequent modify-write operation in which the EDC circuitry in the memory controller determines the failing one or more bits in the data being read, corrects the one or more bits, with the corrected data then written back to the memory address initially read. Such conventional scrub operations may be problematic in systems having an increased likelihood of intermittent fails due to such faults as interconnect faults. If only a single read operation is completed during a scrub operation and an intermittent interconnect fail occurs, the EDC circuitry will incorrectly modify the identified bad memory data and store data back to the memory address location which is incorrect data—since the failure was not a memory failure. As such, such conventional scrub operation, having only a single read, may increase the probability of creating undetectable memory errors should bad data be stored as a result of a memory scrub operation, which causes incorrectly modifying and storing of the data read, with that data then later read in conjunction with another fault, such that the EDC circuitry (e.g. in the memory controller) cannot accurately determine and correct the failing bits.

In accordance with features of the invention, by completing at least two read operations prior to modifying data read during a scrub operation, both the system data integrity is improved and the bus integrity can be monitored as described above thereby improving the overall system integrity and reliability. In conjunction with the memory scrub operation, various bus error detection methods, such as bus CRC and/or detection and correction methods, such as bus EDC, can be implemented thereby enhancing the ability of the system to delineate and track memory interface faults, as determined by one of the two or more reads including valid read data, and differentiate these faults from memory failures, for example, memory device hard fails. The exemplary multi-read scrub operation provides an innovative method for correctly identifying and differentiating bus faults from memory faults, as well as increasing overall system reliability as compared to systems doing conventional scrub operations which may result in incorrect data being stored in memory.

Figure 5:
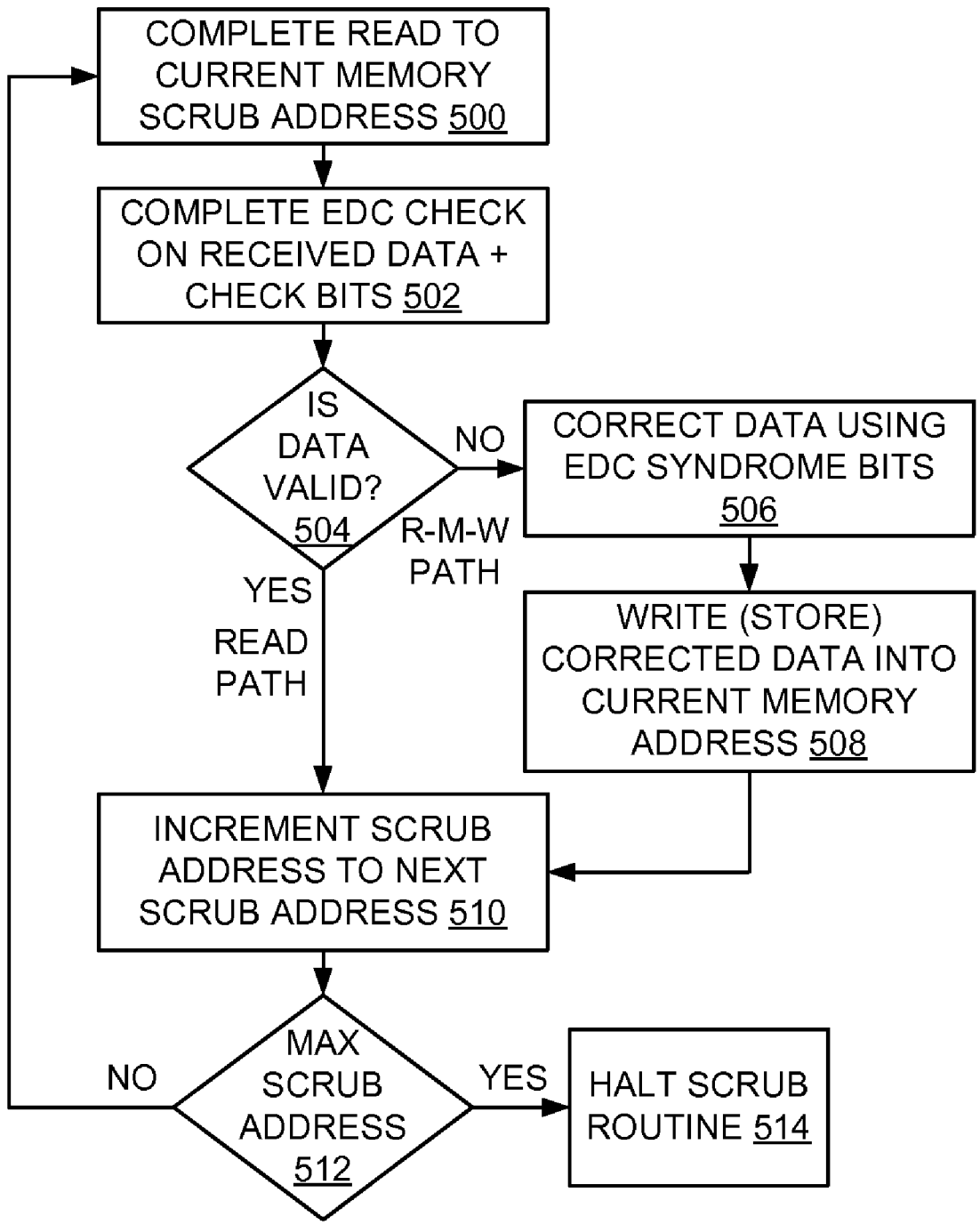
FIGS. 5, 6A, and 6B are flow charts illustrating exemplary steps for implementing enhanced memory reliability using memory scrub operations to determine a frequency of intermittent correctable errors in accordance with the preferred embodiment.
Figure 6A:
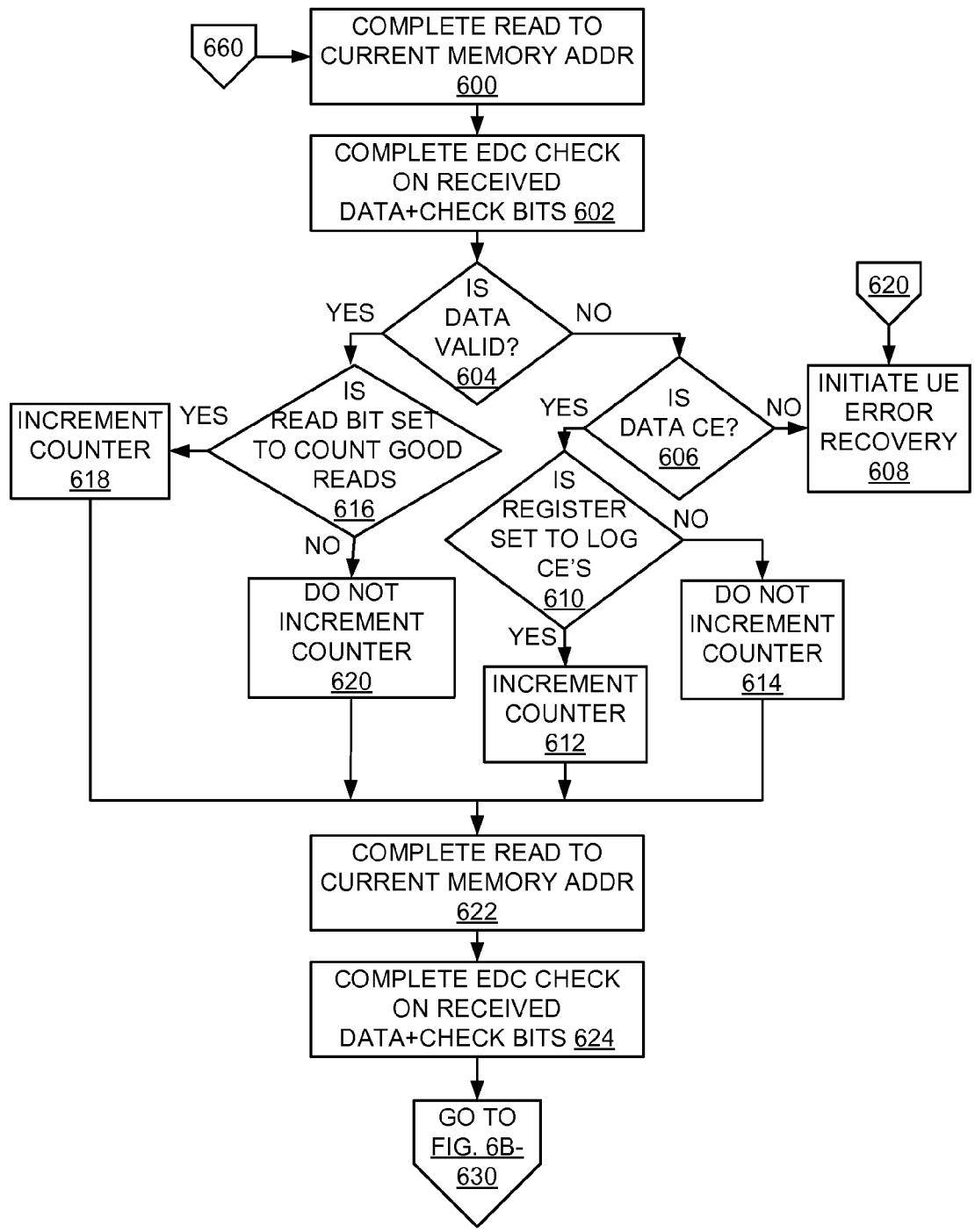
Figure 6B:
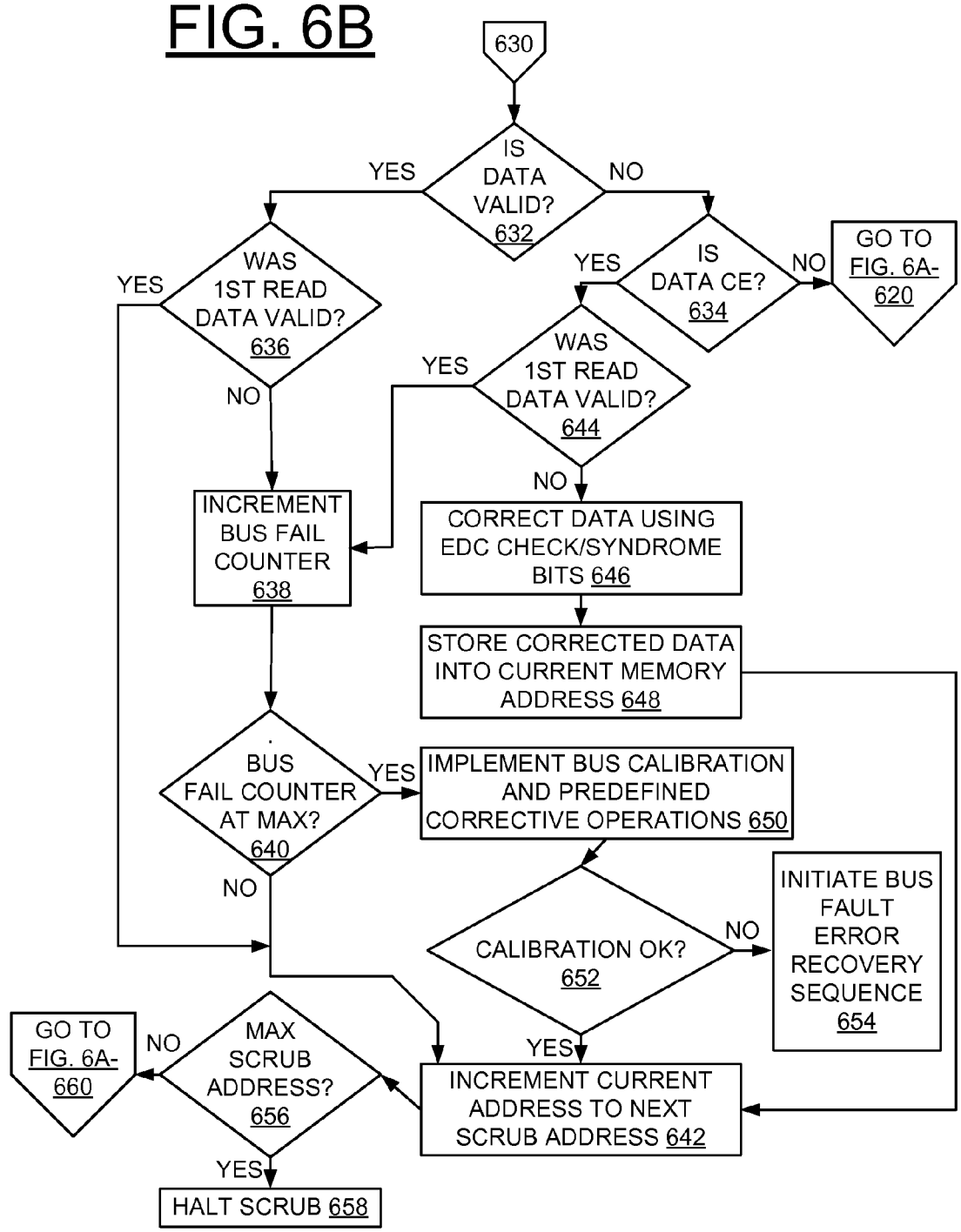

Referring now to FIG. 5 and FIGS. 6A, and 6B there are shown exemplary steps for implementing enhanced memory reliability using memory scrub operations to determine a frequency of intermittent correctable errors, such as those resulting from interconnect faults, in accordance with the preferred embodiment.

In FIG. 5, normal scrub steps are shown, for example, for a first 12-hour period. A read to a memory scrub address is completed as indicated in a block 500. An EDC check, often referred to as ECC check, performed by a memory controller, such as memory controller 108 of FIG. 1, memory controller 202 of FIG. 2, or memory controller 302 of FIG. 3, is completed on the received data and check bits from the read as indicated in a block 502. If the read is bad or the data is not valid as indicated in a decision block 504 as determined by the data EDC circuitry in the memory controller or embedded memory controller in the processor, an assumption is made that the current address includes one or more bad bits, as identified by the EDC circuitry, and a modify-write (M-W) operation is then completed to the failing address, resulting in a read-modify-write (R-M-W) wherein the bad data is corrected by the memory controller EDC logic which determines the defective data bit, nibble, byte, and the like, correcting the one or more bits as indicated in a block 506, and completing a write operation of the corrected data to the original address of the defective read as indicated in a block 508. After the write operation at block 508 or when data is valid at decision block 504, the scrub address is incremented to a next scrub address as indicated in a block 510. Checking for a maximum scrub address is performed as indicated in a decision block 512. Prior to the completion of the maximum intended scrub address range (or time), the operations return to block 500 to continue reading the next scrub address. When a maximum scrub address or time is achieved, the scrub routine ends or halts as indicated in a block 514. In alternate exemplary embodiments, such as in low use periods or very high reliability applications, the scrub operation may be operated on a regular or constant basis.

A problem with the normal scrub process is that an initial defective read may be caused by something other than a data failure, for example, an interface failure may occur with the resulting modify-write (M-W) operation resulting in incorrect data being stored at the address initially accessed. For example, if an interface error occurs that results in the read operation command being converted into a different operation command, such as a refresh operation command, although many other commands may be inappropriately interpreted due to a bus fault, the memory controller would receive invalid data, with the resulting M-W operation then either completely corrupting the data at the selected address. In systems having fault detection such as bus CRC detection, for example, with a failure rate of 10 to the −12, an interface fault not detected by the CRC logic could result in such a write operation, containing invalid data, to an address in response to a command error. In contemporary cascade interconnect systems such as those associated with FIG. 2 and using industry standard Fully Buffered DIMMs, a repeating fault on one of the upstream bitlanes may result in that bitlane being replaced with a previously utilized CRC bitlane, thereby reducing the CRC coverage to well below the initial 10 to the —12 error rate—increasing the probability that an interface error may not be detected. In systems having fault detection on the interface bus and a slow error reporting method (e.g. via an I2C or other serial bus), the M-W may be completed prior to the initial read error being detected— resulting in a loss of the original correct data at that address. For very high reliability systems, an alternative means is needed to better monitor and ensure the integrity of the interface bus, as well as minimize the potential of a scrub operation creating a memory interface fault that will cause a system failure.

During exemplary scrub operations optimized to identify intermittent bus fails or faults, checking is provided to identify interface faults, for example, on the high speed interface in a cascade interconnect system, or in any system that may have interface faults due to such reasons as marginal design, a noisy environment, poor driver and/or receiver training, the use of advanced, very high speed memory device interfaces, and the like. In the scrub for intermittent fails of the invention, at least two reads, such as a read-read (R-R) is completed in accordance with the preferred embodiment before any modify-write (M-W) is completed.

It should be understood that the present invention is not limited to the two reads, an exemplary embodiment could have a selected number N of reads such as 3, 4, 5, and the like, to a single address, in an effort to determine the integrity of bus transfers prior to incrementing a counter in the error log and counters 109 of FIG. 1, completing an interface calibration, running diagnostics, and the like. In either case, multiple possible conditions can occur, with various options available in response in accordance with the preferred embodiments as follows:

First, two reads, or all reads in the case of multiple, more than two reads, pass: In this case, the system assumes that the bus is performing normally and moves to the next address to be scrubbed.

Second, the first read fails but the second read passes: In this case, the system determines that the second passing read indicates that the memory device is very likely performing correctly, and the first read fault was caused by the memory interface, such as noise, marginal timings, and the like, and in the exemplary embodiment, the interface fail counter is incremented. As taught by the present invention, once a predetermined count is attained, the memory interface is re-trained or diagnostic run to better center the data eye to the clock, strobe, or other timing reference for the capture and/or sending of data and the like. As described above, EDC, CRC and/or some other method of bus fault detection may exist in the system, facilitating the indication, in at least some environments, such as bus EDC environments, whether any fault is a bus fault or a memory fault.

Third, the first read passes and the second read fails: In this case, the system optionally does another one or more reads to try to determine the cause of the fail. A memory device may be indicated as the cause of the fail if the additional read or reads fail and if the memory device failed at the second read, it would likely continue to fail with further additional reads. If the memory interface starts failing on an intermittent but rather continuous basis, the system continues to increment the interface fail counter and in the preferred embodiment, advantageously does not wait for the interface fail counter to achieve the predefined, maximum count but instead runs diagnostics, retrains the interface or takes another action to determine the cause of the increased bus failure rate and correct it. In memory systems having spare bitlanes, identification of a faulty bitlane or segment, such as a single point-to-point link between two active devices, may result in all or a portion of the spare bitlane used to repair the faulty portion of the interface, after which retraining and diagnostics may be run to verify the integrity of the interface bus prior to returning to normal operation, likely with the scrub operation continuing. Note that this action advantageously is taken any time the bus starts to fail quite regularly, in spite of the interface fail counter not having reached the preset limit. Otherwise, when the first read passes and the second read fails and the system determines that the memory device now has bad data, a modify write is performed to correct the data. After the modify-write in this case and in any modify-write case, in an exemplary embodiment a read operation advantageously is subsequently completed to ensure that the memory device is now operating normally. In an alternate exemplary embodiment, when a first read passes and the second read fails, a determination may be made that an intermittent bus error has occurred on the second read and if a register is set to log intermittent errors, the register would be incremented and the next scrub address would be read. Other exemplary embodiments would operate similarly, wherein one or more reads are completed after the failing read, prior to changing the scrub address, wherein the additional reads pass EDC checking.

Fourth, both the first and second reads fail. This situation indicates the presence of defective data in the DRAM, such as one or more DRAM cells. In an exemplary embodiment, a modify-write is taken to correct the data. As indicated above and particularly in this case, in an alternate exemplary embodiment following the modify-write operation, a read is performed to see if the fail remains. If fail has been corrected, the fail was likely due to a soft error in the DRAM. If the fail continues, then the fail is marked in a register as a defective cell or nibble, byte, and the like, as determined by the memory data EDC checking. In an alternate exemplary embodiment, a replacement for the failing location may be provided by such means of address re-mapping. Another alternate exemplary embodiment includes completing one or more additional reads, prior to taking an M-W action such that a better determination advantageously is made as to whether the failures are due to bad memory data or a temporary memory bus fault of multiple transfers. In the latter case, a memory bus fault covering multiple transfers indicates the need for an immediate retraining and/or diagnostic to be run, rather than simply logging the faults.

Referring to FIGS. 6A, and 6B, example steps of a scrub for intermittent fails are shown. The scrub for intermittent fails is performed, for example, following the normal scrub operation illustrated in FIG. 5 during a next time period, for example, a second 12-hour period.

It should be understood that the present invention is not limited to the example first time period for a normal scrub and a second time period for a scrub for intermittent fails. For example, a scrub for intermittent fails may optionally replace the normal or conventional scrub such as illustrated in FIG. 5—e.g. in response to an increase in intermittent read errors. In this case, the scrub for intermittent fails is performed for a first time period, and is performed for a second time period. A scrub for intermittent fails optionally is performed at any time the system is idle, at any time the system has available bandwidth, and at any time the system has had a number of scrub faults that exceeds a predetermined limit or scrub faults are occurring at a faster rate, as determined by a counter correlated to a measure of time.

As indicated in a block 600, a read to the memory scrub address is completed. An EDC check is completed on the received data and check bits from the read as indicated in a block 602. If the read is bad or the data is not valid as indicated in a decision block 604 as determined by the data EDC, checking is completed at a decision block 606 to determine whether the syndrome indicates that the data is correctable (CE). If the data is not correctable, an uncorrectable error (UE) error recovery routine is initiated as indicated at a block 608.

Otherwise, when the data is correctable, checking is performed to determine whether a register is set to log correctable errors (CEs), such as a register in a memory controller, for example, a register in memory controller 108 of FIG. 1, memory controller 202 of FIG. 2, or memory controller 302 of FIG. 3, as indicated in a decision block 610. If the register is set, the CE counter is incremented as indicated in a block 612. If the register is not set, then operations continue without incrementing the counter as indicated in a block 614.

When the data is identified as being valid at decision block 604, then checking is performed to determine if a read bit is set count good reads, such as a read bit in a memory controller, for example, a read bit in memory controller 108 of FIG. 1, memory controller 202 of FIG. 2, or memory controller 302 of FIG. 3, as indicated in a decision block 616. If the read bit is set, the good reads counter is incremented as indicated in a block 618. If the read bit is not set, then operations continue without incrementing the counter as indicated in a block 620.

As indicated in a block 622, a second read to the current memory scrub address is completed. An EDC check is completed on the received data and check bits from the read as indicated in a block 624, similar to that completed in block 602. Then operation continues following entry point 630 in FIG. 6B.

Referring now to FIG. 6B following entry point 630, if the read is bad or the data is not valid as indicated in a decision block 632 as determined by the data EDC, checking is completed at decision block 634 to determine whether the syndrome indicates that the data is correctable. If the data is not correctable, an uncorrectable error (UE) error recovery routine is initiated returning to FIG. 6A following entry point 620 at block 608.

If the data is valid as identified at decision block 632, a check is performed to determine whether the first read data was valid as indicated in a decision block 636. If the first read data was not valid, the bus fail counter is incremented as indicated in a block 638. Next checking is performed to determine whether the bus fail counter is at a maximum value in a decision block 640. If the bus fail counter is not at the maximum value, then the current address is incremented to a next scrub address as indicated in a block 642.

When the data is correctable at decision block 634, then checking is performed to determine whether the first read data was valid as indicated in a decision block 644. If the first read data was valid, the bus fail counter is incremented at block 638 and the operations continue as described previously. If the first read data was not valid, then the data is corrected using the EDC check/syndrome bits as indicated in a block 646. The corrected data is stored in the current memory address as indicated in a block 648. Then the current address in incremented to a next scrub address at block 642.

When the bus fail counter is a maximum value at decision block 640, then bus calibration and other predefined corrective operations are implemented as indicated in a block 650. The bus calibration and predefined corrective operations typically include completion of a selected predefined diagnostic and retraining sequence to provide, for example, improved centering of a data eye to a predefined timing reference, clock or data strobe signal. Then checking is completed to determine if the calibration is within targeted limits is performed as indicated in a decision block 652. If the calibration fails, a bus fault error recovery sequence is initiated as indicated in a block 654. Such recovery may include bitlane or segment sparing or other actions. Otherwise if the calibration is successfully completed, then the current address is incremented to a next scrub address at block 642.

After incrementing to a next scrub address, checking for achieving the maximum scrub address is performed as indicated in a decision block 656. When the scrub address is less than the maximum address, the scrub operation returns to FIG. 6A following entry point 660 at block 600 to continue reading the next scrub address. When the maximum scrub address is achieved, the scrub routine ends or halts as indicated in a block 658. As described above, the scrub routine may be immediately restarted, and other actions may be taken in response to a fail on a first, second third or more successive read operations—similar to those taught in FIG. 6A and FIG. 6B, without departing from the scope of the invention.

Figure 7:
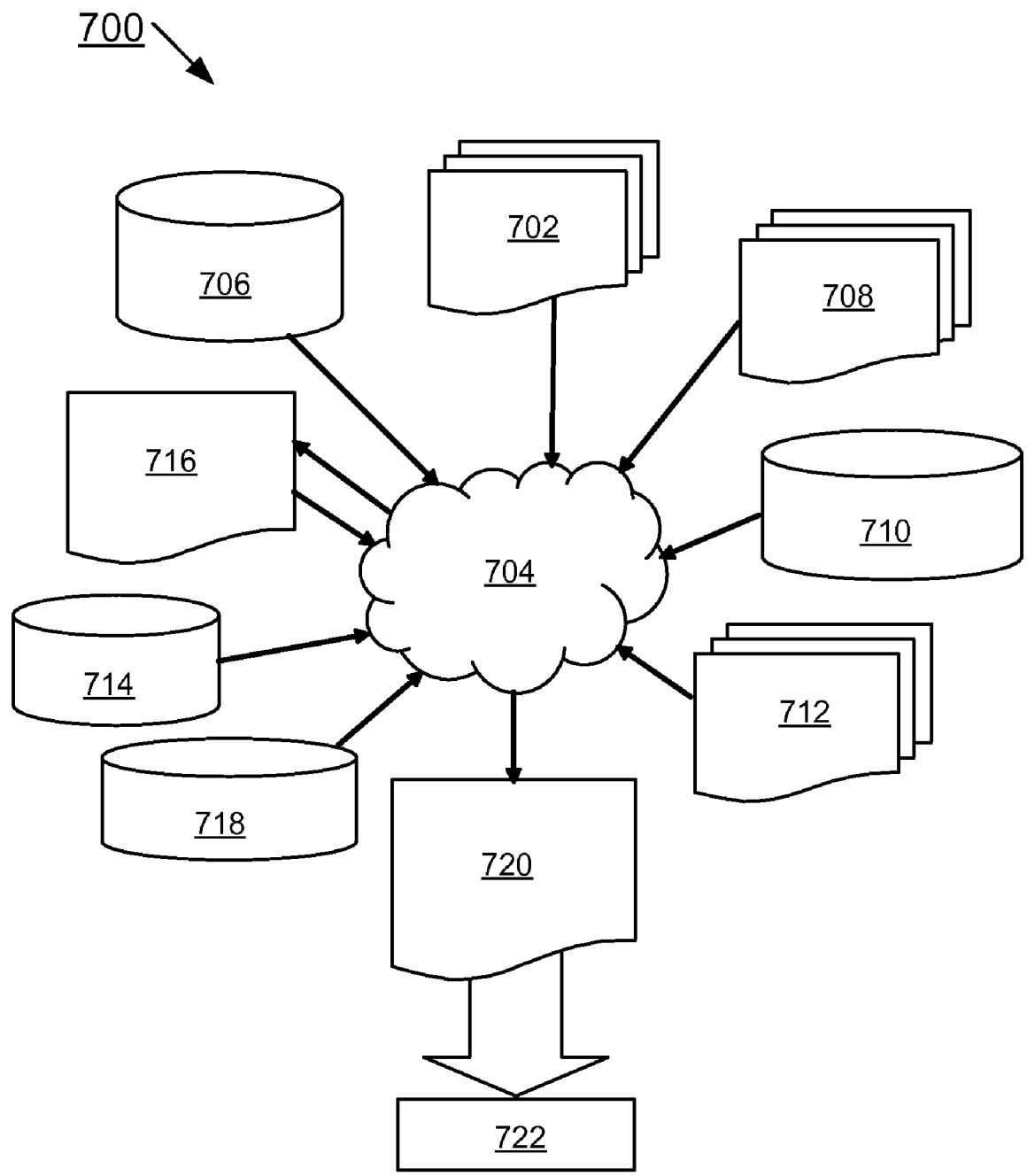
FIG. 7 is a flow diagram of a design process used in semiconductor design, manufacturing, and/or test.

FIG. 7 shows a block diagram of an example design flow 700. Design flow 700 may vary depending on the type of IC being designed. For example, a design flow 700 for building an application specific IC (ASIC) may differ from a design flow 700 for designing a standard component. Design structure 702 is preferably an input to a design process 704 and may come from an IP provider, a core developer, or other design company or may be generated by the operator of the design flow, or from other sources. Design structure 702 comprises circuit 100, and circuit 300 in the form of schematics or HDL, a hardware-description language, for example, Verilog, VHDL, C, and the like. Design structure 702 may be contained on one or more machine readable medium. For example, design structure 702 may be a text file or a graphical representation of each circuit 100, 400, 500. Design process 704 preferably synthesizes, or translates, circuit 100, circuit 400, and circuit 500 into a netlist 706, where netlist 706 is, for example, a list of wires, transistors, logic gates, control circuits, I/O, models, and the like, that describes the connections to other elements and circuits in an integrated circuit design and recorded on at least one of machine readable medium. This may be an iterative process in which netlist 706 is resynthesized one or more times depending on design specifications and parameters for the circuit.

Design process 704 may include using a variety of inputs; for example, inputs from library elements 708 which may house a set of commonly used elements, circuits, and devices, including models, layouts, and symbolic representations, for a given manufacturing technology, such as different technology nodes, 32 nm, 45 nm, 90 nm, and the like, design specifications 710, characterization data 712, verification data 714, design rules 716, and test data files 718, which may include test patterns and other testing information. Design process 704 may further include, for example, standard circuit design processes such as timing analysis, verification, design rule checking, place and route operations, and the like. One of ordinary skill in the art of integrated circuit design can appreciate the extent of possible electronic design automation tools and applications used in design process 704 without deviating from the scope and spirit of the invention. The design structure of the invention is not limited to any specific design flow.

Design process 704 preferably translates an embodiment of the invention as shown in FIGS. 1, 4, and 5 along with any additional integrated circuit design or data (if applicable), into a second design structure 720. Design structure 720 resides on a storage medium in a data format used for the exchange of layout data of integrated circuits, for example, information stored in a GDSII (GDS2), GL1, OASIS, or any other suitable format for storing such design structures. Design structure 720 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 4, and 5. Design structure 720 may then proceed to a stage 722 where, for example, design structure 720 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing enhanced memory reliability in a memory system using memory scrub operations comprising the steps of:
    performing a memory scrub for intermittent fails including at least two reads at each memory scrub address before moving to a next memory scrub address;
    identifying an intermittent error, responsive to identifying one failing read and one passing read of the at least two reads;
    tracking a number of said identified intermittent errors;
    identifying a predefined number of said identified intermittent errors, and implementing a bus calibration sequence; and
    initiating a bus fault error recovery sequence responsive to a failing bus calibration sequence.

2. The method for implementing enhanced memory reliability as recited in claim 1 includes moving to a next memory scrub address responsive to identifying said intermittent error.

3. The method for implementing enhanced memory reliability as recited in claim 1 includes performing a first scrub sequence during a first time period, said first scrub sequence including a single read to each memory scrub address before moving to a next memory scrub address.

4. The method for implementing enhanced memory reliability as recited in claim 3 includes performing the scrub for intermittent fails during a second time period following said first scrub sequence.

5. The method for implementing enhanced memory reliability as recited in claim 1 includes performing the scrub for intermittent fails for a first time period and performing the scrub for intermittent fails for a second time period, said performing the scrub for intermittent fails replaces the single read memory scrub operations.

6. The method for implementing enhanced memory reliability as recited in claim 1 includes performing the scrub for intermittent fails when the memory system has available bandwidth.

7. The method for implementing enhanced memory reliability as recited in claim 1 includes performing the scrub for intermittent fails when the memory system is idle.

8. A method for implementing enhanced memory reliability in a memory system using memory scrub operations comprising the steps of:
    performing a memory scrub for intermittent fails including at least two reads at each memory scrub address before moving to a next memory scrub address;
    identifying an intermittent error, responsive to identifying one failing read and one passing read of the at least two reads;
    tracking a number of said identified intermittent errors;
    identifying a predefined number of said identified intermittent errors, and implementing a bus calibration sequence including performing a predefined diagnostic and retraining sequence.

9. The method for implementing enhanced memory reliability as recited in claim 8 wherein performing a predefined diagnostic and retraining sequence includes centering a data eye to a predefined timing reference.

10. The method for implementing enhanced memory reliability as recited in claim 8 includes performing a modify-write sequence when the first read and the second read fail, and moving to a next memory scrub address.

11. A circuit for implementing enhanced memory reliability in a memory system using memory scrub operations comprising:
    a memory controller for performing a memory scrub for intermittent fails in a memory including at least two reads at each memory scrub address before moving to a next memory scrub address;
    said memory controller identifying an intermittent error, responsive to identifying one failing read and one passing read of the at least two reads;
    said memory controller tracking a number of said identified intermittent errors;
    said memory controller implementing a bus calibration sequence, responsive to identifying a predefined number of said identified intermittent errors including performing a predefined diagnostic and retraining sequence.

12. The circuit for implementing enhanced memory reliability as recited in claim 11 wherein said memory controller, responsive to identifying a failing first read and a failing second read, performs a modify-write, and moves to a next memory scrub address.

13. The circuit for implementing enhanced memory reliability as recited in claim 11 wherein said memory controller moves to a next memory scrub address responsive to identifying and counting each said intermittent error.

14. A non-transitory computer readable storage medium storing a design structure, wherein the design structure comprises:
    a circuit tangibly embodied in the non-transitory machine readable medium used in the design process, said circuit for implementing enhanced memory reliability in a memory system using memory scrub operations, said circuit including:
    a memory controller performing a memory scrub for intermittent fails of a memory including at least two reads at each memory scrub address before moving to a next memory scrub address;
    said memory controller identifying an intermittent error, responsive to identifying one failing read and one passing read of the at least two reads;
    said memory controller tracking a number of said identified intermittent errors; and said memory controller implementing a bus calibration sequence responsive to identifying a predefined number of said identified intermittent errors; and
    said memory controller implementing a bus calibration sequence responsive to identifying a predefined number of said identified intermittent errors including performing a predefined diagnostic and retraining sequence, wherein the design structure, when read and used in the manufacture of a semiconductor chip produces a chip comprising said circuit.

15. The non-transitory computer readable storage medium storing the design structure of claim 14, wherein the design structure comprises a netlist, which describes said circuit.

16. The non-transitory computer readable storage medium storing the design structure of claim 14, wherein the design structure resides on storage medium as a data format used for the exchange of layout data of integrated circuits.

17. The non-transitory computer readable storage medium storing the design structure of claim 14, wherein the design structure includes at least one of test data files, characterization data, verification data, or design specifications.

18. The The non-transitory computer readable storage medium storing the design structure of claim 14, wherein said memory controller, responsive to identifying two failing reads of the at least two reads, performs a modify write, and moves to a next memory scrub address.

19. The non-transitory computer readable storage medium storing the design structure of claim 14, wherein said memory controller moves to a next memory scrub address responsive to identifying and counting each said intermittent error.

20. The non-transitory computer readable storage medium storing the design structure of claim 14, wherein said memory controller performs the scrub for intermittent fails for a first time period, and performs the scrub for intermittent fails for a second time period, and wherein performing the scrub for intermittent fails replaces single read memory scrub operations.

* * * * *